(12) United States Patent
Stoyanov et al.

(10) Patent No.: US 10,829,039 B2
(45) Date of Patent: Nov. 10, 2020

(54) DISPLAY ARRANGEMENT FOR AN INSTRUMENT CLUSTER

(71) Applicant: Visteon Global Technologies, Inc., Van Buren Township, MI (US)

(72) Inventors: Hristo Stoyanov, Van Buren Township, MI (US); Ahmed Karaibrahimov, Sofia (BG); Filipina Lozanova Grozdanova, Sofia (BG); Danail Branimirov Sandalski, Van Buren Township, MI (US); Ivo Sevdalinov Kostadinov, Ann Arbor, MI (US); Petar Bozhkov, Sofia (BG)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 16/789,916

(22) Filed: Feb. 13, 2020

(65) Prior Publication Data
US 2020/0262339 A1 Aug. 20, 2020

Related U.S. Application Data

(60) Provisional application No. 62/807,057, filed on Feb. 18, 2019.

(51) Int. Cl.
*B60K 35/00* (2006.01)
*B60Q 3/18* (2017.01)
*G09G 3/34* (2006.01)

(52) U.S. Cl.
CPC .............. *B60Q 3/18* (2017.02); *B60K 35/00* (2013.01); *G09G 3/3406* (2013.01); *B60K 2370/349* (2019.05)

(58) Field of Classification Search
CPC .......... G09G 3/001; G02B 6/0071; H04N 5/64
See application file for complete search history.

(56) References Cited

U.S. PATENT DOCUMENTS

| 5,678,912 | A * | 10/1997 | Ayres | B60K 37/02 362/23.17 |
| 5,997,161 | A * | 12/1999 | Stringfellow | B60K 37/02 362/489 |
| 8,125,771 | B2 * | 2/2012 | Yukawa | G06F 1/16 361/679.21 |
| 2006/0215072 | A1 * | 9/2006 | Hashino | G02F 1/133608 349/58 |
| 2008/0192169 | A1 * | 8/2008 | Makino | G02F 1/133308 349/58 |

(Continued)

FOREIGN PATENT DOCUMENTS

DE 102017212912 A1 1/2019

*Primary Examiner* — Munear T Akki
(74) *Attorney, Agent, or Firm* — Quinn IP Law (57) ABSTRACT

A system and method for adjusting the display of light-based content of a display system includes a display unit. The display unit includes a first layer cooperating with a backlight, a second layer disposed proximate the first layer and a third layer disposed proximate the second layer. At least one microcontroller in communication with the display unit includes a first processing unit configured to receive a dimming level value and a second processing unit. The second processing unit evaluates the dimming level value against a threshold value and adjusts one or more properties of the display unit in response to the measured values.

20 Claims, 7 Drawing Sheets

(56) References Cited

U.S. PATENT DOCUMENTS

| | | | |
|---|---|---|---|
| 2016/0207453 A1* | 7/2016 | McDade | G01D 5/262 |
| 2016/0209250 A1* | 7/2016 | Hopersberger | B60K 35/00 |
| 2018/0065483 A1 | 3/2018 | Liburdi et al. | |
| 2019/0385574 A1* | 12/2019 | Helot | B60K 35/00 |

* cited by examiner

DISPLAY ARRANGEMENT FOR AN INSTRUMENT CLUSTER

CROSS-REFERENCE TO RELATED APPLICATIONS

This application claims the benefit of U.S. Provisional Application No. 62/807,057, filed Feb. 18, 2019, which is hereby incorporated by reference in its entirety.

TECHNICAL FIELD

The present disclosure generally relates to systems and methods for displaying content on a display device, and more particularly to systems and methods for adjusting the display of light-based content on a vehicle electronic instrument cluster.

BACKGROUND

Electronic display systems are used in many different technology applications. Vehicles, such as automobiles, may be equipped with an instrument panel disposed in the dashboard of the vehicle in a line of sight of the operator of the vehicle. Instrument panels may include clusters of gauges and indicators, with each gauge and indicator presenting operationally relevant information to a system user, such as the revolutions-per-minute (RPM) of the vehicle's engine, the engine temperature and a present state of vehicle lighting.

Early instrument panels employed gauge clusters that operated primarily as analog devices. In a motor vehicle context, speedometers and fuel gauges may be two analog gauges in which an indicator, such as a needle or a pointer, is physically moved by a corresponding input between defined lower and upper range limits. In contrast to such analog gauges, modern digital gauges include transducers or other sensors which output electrical signals to a microprocessor. The electrical signals may be proportional to the measured value, e.g., a proportional voltage signal. In response to such signals, the microprocessor automatically adjusts a corresponding digital readout for display to the user, e.g., as a graphical icon, an image, and/or text.

Instrument panels generally include a plurality of indicators that, when activated, are visible to the vehicle operator. As with analog gauges, early implementations of the indicators were positioned on the instrument panel and included a light source, such as a light emitting diode (LED) or other lighting element, cooperating with an applique having an image representing a vehicle operation or system. The lighting source is activated in response to detection of a change in state of the vehicle.

SUMMARY

Systems and methods are disclosed herein for adjusting the display of light-based content on a vehicle electronic instrument cluster. The system according to one or more aspects includes a display system for a vehicle includes a display unit including a backlight and one or more layers cooperating with the backlight. The one or more layers include a first layer including a first side for displaying content and an opposing second side cooperating with the backlight, a second layer adjustable between at least a light permeable state and a light impermeable state including a first side and an opposing side disposed proximate the first side of the first layer, and a third layer including a first side for displaying one or more primary indicators and an opposing second side disposed proximate the first side of the second layer.

A first processing unit is in communication with the one or more layers and the backlight of the display unit. A second processing unit is in communication with the first processing unit. The first processing unit renders the content displayed on the first layer and the one or more primary indicators displayed on the third layer in response to one or more output signals from the second processing unit.

The first processing unit detects the one or more output signals from the second processing unit representative of a dimming value of light intensity of the backlight and evaluates the dimming level value against a system threshold value of light intensity of the backlight. The first processing unit generates one or more control signals to adjust light intensity of the backlight in response to the evaluation of the dimming level value against the system threshold value.

In one or more aspects, a non-transitory computer-readable medium with computer-readable instructions stored therein for adjusting light intensity of a display system of a vehicle is provided. The display system includes a backlight, a first layer for displaying content and cooperating with the backlight, a second layer adjustable between at least a light permeable state and a light impermeable state disposed proximate the first layer, and a third layer for displaying one or more primary indicators disposed proximate the second layer.

Execution of the computer-readable instructions by a first processing unit and a second processing unit of a microcontroller causes the microcontroller to detect one or more input signals with the second processing unit from one or more components of the vehicle and command the second processing unit to transmit one or more output signals to the first processing unit representative of a dimming value of light intensity of the backlight based on the one or more input signals from the one or more vehicle components.

Execution of the computer-readable instructions by a first processing unit and a second processing unit of a microcontroller causes the microcontroller to command the first processing unit to evaluate the one or more output signals from the second processing unit against a system threshold value of light intensity of the backlight and command the first processing unit to transmit one or more control signals to adjust light intensity of the backlight in response to the evaluation of the dimming level value against the system threshold value. Execution of the computer-readable instructions by a first processing unit and a second processing unit of a microcontroller causes the microcontroller to command the first processing unit to transmit one or more control signals to adjust the second layer to one of the light permeable state and the light impermeable state to adjust light intensity of the content on the first layer projected through the second layer of the display unit in response to the evaluation of the dimming level value against the system threshold value.

The above features and advantages and other features and advantages of the present teachings are readily apparent from the following detailed description and accompanying drawings.

The present disclosure may have various modifications and alternative forms, and some representative aspects are shown by way of example in the drawings and will be described in detail herein. Aspects of this disclosure are not limited to the forms illustrated in the above-enumerated drawings. The disclosure is to cover modifications, equivalents, and combinations falling within the scope of the disclosure as encompassed by the appended claims.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a display system 10 is generally described. The display system 10 is not shown or described as part of a specific application. It should be appreciated that the display system 10, or aspects thereof, may be utilized in many different applications, such as but not limited to a vehicular application, an entertainment application, and an advertising display application.

Exemplary vehicular applications include but are not limited to automobiles, airplanes, trains, boats, motorcycles, all-terrain vehicles (ATVs), utility type vehicles (UTVs), etc. For example, the display system 10 may be incorporated into an instrument cluster, a center console display, a passenger entertainment display, etc. Exemplary entertainment applications include, but are not limited to, gaming systems, televisions, computer screens, etc. The teachings of this disclosure are not limited to the exemplary applications and environments noted above.

Figure 1:
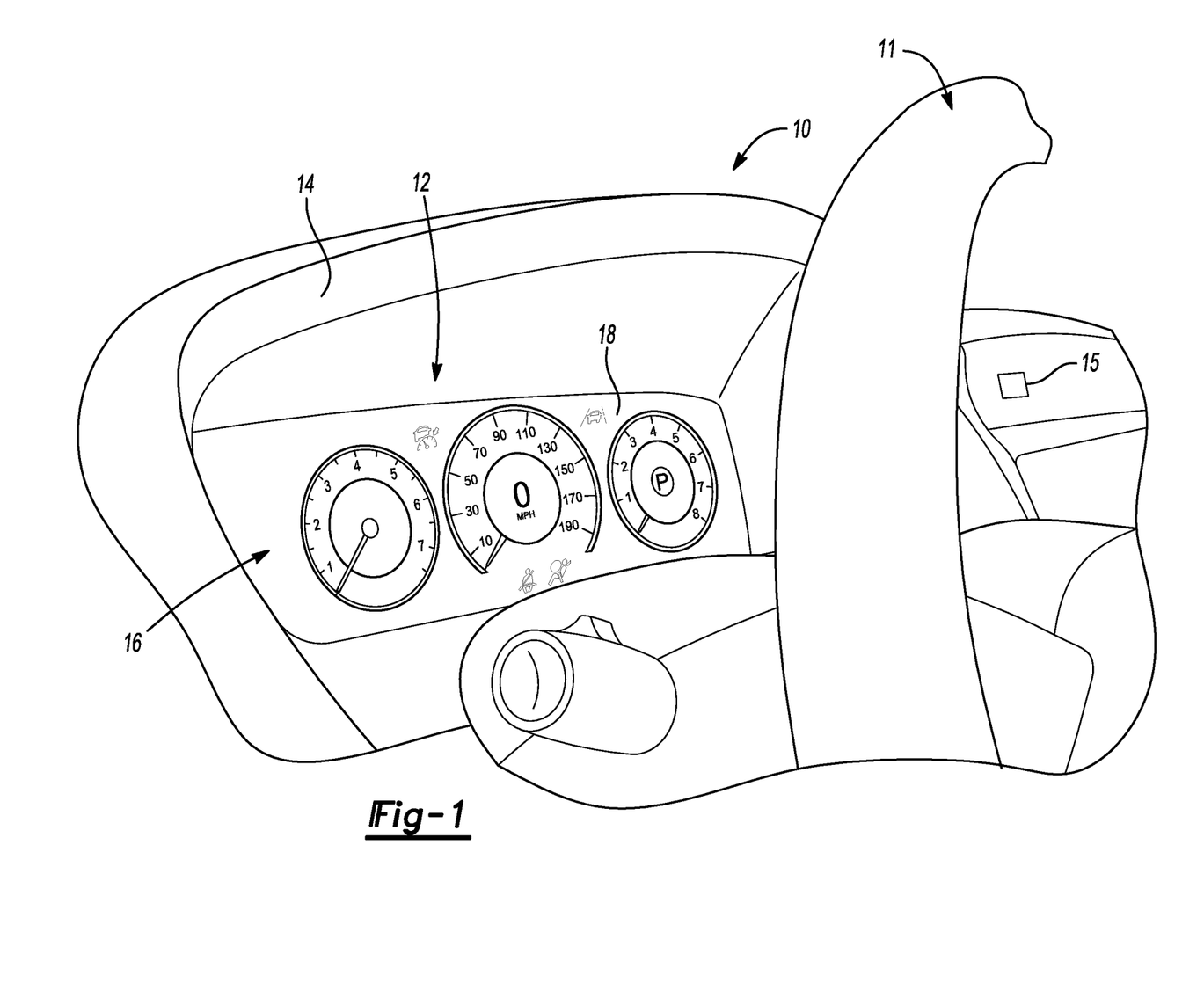
FIG. 1 is a perspective view of a display system incorporated in a vehicle, which is in accordance with one or more aspects disclosed herein.

FIG. 1 shows an instrument cluster 12, in accordance with the one or more aspects of the display system 10, that may be used as part of a vehicle or other mobile or stationary system in certain aspects, such as but not limited to a motor vehicle, which may be positioned or disposed within a dashboard 14 or another interior component of the vehicle. The instrument cluster 12 includes a display unit 16 having a display surface 18.

The display system 10 may be incorporated as part of the instrument cluster 12 or integrated into the instrument cluster 12. The display system 10 may be implemented with a processor or non-transitory computer readable medium, installed or integrated in the vehicle. In other aspects, the display system 10 may be stored in a secondary device, such as a persistent store associated with an electronic control unit (ECU) associated with the vehicle.

The instrument cluster 12 may include at least one display unit 16. The instrument cluster 12 may include at least one of a digital display unit or a hybrid display unit, including a combination of at least one analog gauge and at least one digital display unit. The instrument cluster 12 may also include one or more digital displays. The display unit 16 may include a device that may generate and emit light, particularly for forming an image on or through a display surface 18. For example, the display unit 16 may include a device such as a Light Emitting Diode (LED) display, an Organic Light Emitting Diode (OLED) display, a Thin Film Transistor (TFT) display, a Liquid Crystal Display (LCD), a Plasma Display Panel (PDP) or the like.

The instrument cluster 12 may be implemented with one or more system components, including, but not limited to, an actuating device 15. In certain implementations, the actuating device 15 may be an engageable input device situated on or around the instrument cluster 12. In another case, the actuating device 15 may be a graphical user interface (GUI) input or icon displayed via the display unit 16. Thus, the display unit 16 may be any sort of touch screen interface. The actuating device 15 is not limited to touchable interfaces, and thus, any known human machine interface (HMI) technique may be implemented along with actuating device. The actuating device 15 may be implemented by a user to generate an input signal from the actuating device representative of a dimming level value for the backlight 38 for the display unit 16.

Figures 2, 3:
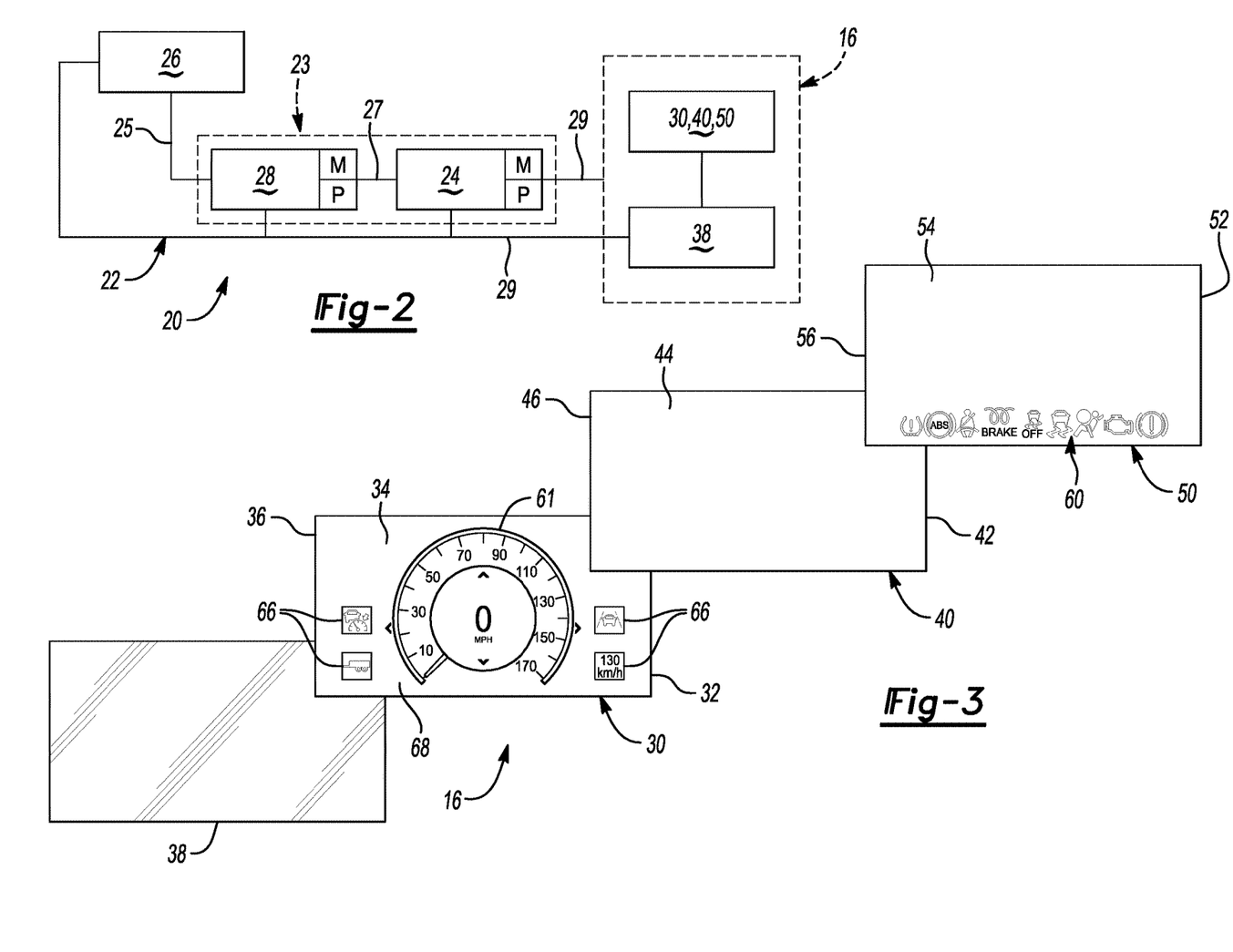
FIG. 2 is a schematic illustration of a system for adjusting the display of light-based content on a vehicle electronic instrument cluster in accordance with one or more aspects.
FIG. 3 is a schematic exploded plan view of a display unit for a display system, which is in accordance with one or more aspects.

The system and method for adjusting the display of content on the display unit 16 of the display system 10 is shown schematically in FIG. 2. A schematic view of an electronic system 20 connected to and cooperating with the display system 10 is shown in greater detail. The electronic system 20 may include a bus or networking communications arrangement or bus 22 allowing communication between the display unit 16 and at least one microcontroller (MC), generally referenced by number 23.

The components of the display system 10 may be coupled in a wired or wireless manner via controller area network (CAN) bus 22 (or other way to connect vehicular subcomponents). A CAN bus 22 is a vehicle bus standard designed to allow microcontrollers and devices to communicate bidirectionally with each other in applications without a host computer. Bus 22 is a message-based protocol, designed originally for multiplex electrical wiring within automobiles, but is also used in many other contexts. Other vehicle components that may be connected to the bus 22, such as a door locking system, heating, ventilation and air conditioning (HVAC) system and the like, are not shown.

The at least one microcontroller 23 may include one or more processors (P), each of which may be embodied as a separate processor, an application specific integrated circuit (ASIC), or a dedicated electronic control unit. The at least one microcontroller 23 may be any sort of electronic processor (implemented in hardware, software, or a combination of both) installed in a vehicle to allow the various electrical subsystems to communicate with each other. The at least one microcontroller 23 also includes tangible, non-transitory memory (M), e.g., read only memory in the form of optical, magnetic, and/or flash memory.

For example, the at least one microcontroller 23 includes application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be stored in memory (M) and executed as set forth herein. The executable instructions may be a series of instructions employed to run applications on the at least one microcontroller 23 (either in the foreground or background), and allow either automated control of the vehicular subsystems, or direct control through engagement of an occupant of the vehicle in any of the provided HMI techniques.

The at least one microcontroller 23 may serve as a central processor or processing unit that allows communication with various mechanical and electronic components, including, but not limited to, a fuel sensor, a speed sensor, or the like. The at least one microcontroller 23 may propagate the commands and information from the various electronic components associated with the vehicle and communicates an instruction to the display unit 16 of the instrument cluster 12 of the display system 10 accordingly. For example, in one mode, the display unit 16 may display information associated with the speed of the vehicle, as indicated by information from the vehicle speed sensor, in response to information received from the at least one microcontroller 23.

In one or more aspects, the at least one microcontroller 23 includes a first microcontroller or first processing unit 24 and a second microcontroller or second processing unit 28 in electrical communication with the first processing unit 24. The first processing unit 24 may be a graphical processing unit in communication with and configured to control the display unit 16. The second processing unit 28 may be a processing unit in communication with one or more components of the system or vehicle.

Execution of the computer-readable instructions by the first processing unit 24 and the second processing unit 28 of the microcontroller 23 causes the microcontroller 23 to detect and receive one or more input signals, generally referenced as 25, from one or more components 26 of the system or vehicle with the second processing unit 28. The one or more input signals 25 may be representative of measurements or values of the operating states of one or more components 26 of the vehicle, including, but not limited to, output from the vehicle speed sensor, output from the tire pressure monitoring system, output from a sensor measuring the ambient light level, in the vehicle and the like. The measurements and operating states of the vehicle are not limited by the examples disclosed herein. The one or more input signals 25 may also include input signals received from the actuating device 15 or GUI interface as shown in FIG. 1.

In response to the one or more input signals 25, the second processing unit 28 may generate and transmit one or more output signals 27 to the first processing unit 24. The first processing unit 24 may evaluate the one or more output signals 27 from the second processing unit 28 against a system threshold value of light intensity of the backlight 38. The first processing unit 24 may additionally generate and transmit one or more control signals 29 to a backlight 38 of the display unit 16. The first processing unit 24, as will be described in greater detail below, may transmit one or more control signals 29 to the backlight 38 to adjust light intensity of the backlight 38 based upon a dimming level value.

The first processing unit 24, in response to receiving one or more output signals 27 from the second processing unit 28, may transmit one or more control signals 29 to the display unit 16, causing the display unit 16 to render one or more display features or indicators. The display unit 16 may include a backlight 38 and one or more layers 30, 40, 50 for rendering the one or more display features or indicators as will be described in greater detail below.

For example, in response to detection of an input signal 25 from one or more components 26 of the system or vehicle, such as the vehicle speed sensor, the second processing unit 28 may generate and transmit one or more output signals 27 to the first processing unit 24, instructing the first processing unit 24 to render or show a graphic indication of a speedometer illustrating the vehicle speed on the display unit 16. Alternatively, in response an input signal 25 from one or more components 26 of the vehicle, such as the tire pressure monitoring system, the second processing unit 28 may generate and transmit one or more output signals 27 to the first processing unit 24, instructing the first processing unit 24 to render or show a graphic indication of a tire pressure indicator or tell-tale on the display unit 16.

Referring now to FIGS. 1 and 3, the display unit 16 of the instrument cluster 12 is described in greater detail. The display unit 16 may include one or more cooperating surfaces or layers for rendering or digitally displaying information and content. The one or more layers may include at least a first layer 30, a second layer 40 and a third layer 50. For exemplary purposes, the third layer 50 may be disposed closest to the passenger compartment represented by components of the vehicle such as the steering wheel 11 shown in FIG. 1 and may also function as the display surface 18 as shown in FIG. 4.

The second layer 40 may be positioned proximate to and behind or below the third layer 50 relative to the passenger compartment, while the first layer 30 is positioned proximate to and behind or below the second layer 40 relative to the passenger compartment. As such, from a viewer's perspective, the third layer 50 would be positioned proximate to an occupant of the passenger compartment of the vehicle who is looking head-on at the display unit 16, and similarly, the first layer 30 would be distal to the occupant. Layers 30, 40, 50 may be optically bonded, connected or joined.

In one or more aspects of the display unit 16 shown schematically in FIG. 3, the first layer 30 of the display unit 16 may be configured as a digital presentation device, such as a TFT, OLED, OLEV, LCD, CRT technology driven device. The first layer 30 may include a body 32 defining a first side 34 and an opposing second side 36. The first side 34 may be configured to display digital representations of information and content, such as a group of virtual or reconfigurable instruments that display operational information of the vehicle. For example, in one display mode, the first side 34 of the first layer 30 may display content, including, but not limited to, a speedometer representing the speed of the vehicle as measured by the speed sensor (not shown) of the vehicle, a tachometer, a fuel level gauge and other vehicle operation information.

Figure 4:
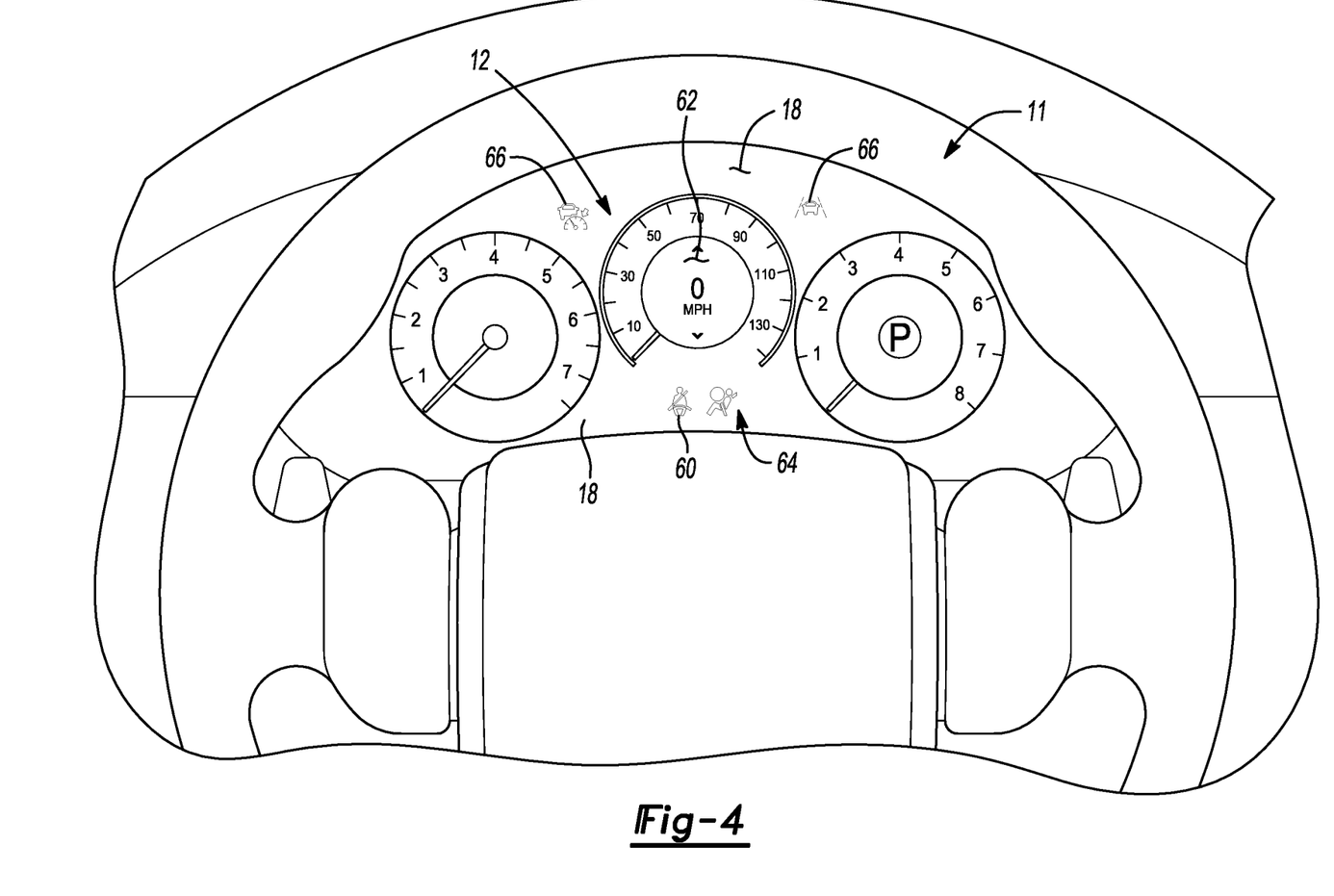
FIG. 4 is a plan view of an instrument cluster incorporating the system adjusting the display of light-based content in accordance with one or more aspects.

A backlight 38 cooperates with the first layer 30 to illuminate the rendered or digital representations of content, such as virtual instruments or information, generated on the first side 34 of the first layer 30, as shown in FIGS. 1 and 4. The backlight 38 may cooperate with the second side 36 of the first layer 30 to illuminate one or more layers 30, 40, 50 of the display unit 16.

The backlight 38 is adjustable between at least an off state and an on state. In one or more aspects, when the backlight 38 is placed in the off state, the backlight does not emit light, which corresponds to zero percent (0%) light transmittance or light intensity. When the backlight is placed in an on state, the backlight 38 emits light corresponding to a range of light transmittance or light intensity between greater than zero percent (0%) light transmittance or light intensity and one hundred percent (100%) light transmittance or light intensity.

The backlight 38 may be connected to and receive one or more control signals 29 from the first processing unit 24 as illustrated in FIG. 2 to adjust light intensity of the backlight 38 based upon a dimming level value of light transmittance or light intensity of the backlight 38. In one or more aspects, the dimming level value may be generated by the second processing unit 28 in response to the one or more input signals 25 and transmitted to the first processing unit 24 through the one or more output signals 27.

The dimming level value transmitted from the second processing unit 28 may be in a range defined by a lower level of about forty percent (40%) light transmittance or light intensity generated by the backlight 38 and an upper level of one hundred percent (100%) light transmittance or light intensity generated by the backlight 38. It is understood that the lower level and upper level of the range of light intensity generated by the backlight 38 may be adjusted to accommodate various vehicle, system, method or user settings or configurations.

Referring to FIGS. 1 and 3, the display unit 16 further includes a second layer 40 disposed proximate the first layer 30. The second layer 40 includes a body 42 defining a first side 44 and an opposing second side 46. The body 42 of the second layer 40 may be sized such that the second side 46 of the second layer 40 at least partially covers the first side 34 of the first layer 30. In one or more aspects, the second layer 40 may be sized to the dimensions of the first side 34 of the first layer 30 to cover the first layer 30 with the second layer 40.

The second layer 40 may be configured to regulate the intensity of light transmitted from the backlight 38, through the first layer 30 and projected through the second layer 40. The second layer 40 may be connected to and be in communication with the first processing unit 24 shown in FIG. 2 such that, in response to receiving one or more control signals 29 from the first processing unit 24, the light permeability of the second layer 40 may be adjusted to effect the display of the rendering or digital representations of information and content generated on the first side 34 of the first layer 30 when the first layer 30 is viewed through the second layer 40 as illustrated in FIGS. 1 and 3.

The second layer 40 may include a film or other treatment that is applied to one or more sides 44, 46 of the second layer 40. In one or more aspects, the film may be an electric tinting film applied to and positioned on the first side 44 or the second side 46 of the body 42 of the second layer 40. The electric tinting film is adjustable in response to one or more control signals 29 from the first processing unit 24 between a light permeable state, such as a transparent state or a translucent state, and a light impermeable state, such as an opaque state, to control dispersion or permeability of light therethrough.

In one or more aspects, the second layer 40 may include a liquid crystal display (LCD) element that is adjustable between a light permeable state, such as a transparent or translucent state, and a light impermeable state, such as an opaque state. The light permeability of the LCD element of the second layer 40 may be adjusted by the first processing unit 24 by controlling the alignment of liquid crystal molecules between variously ordered molecule configurations by applying an electrical field to arrange the molecules between the light permeable state, whereby light passes through the LCD element, and the light impermeable state, whereby light does not pass through the LCD element of the second layer 40.

Referring again to FIGS. 1 and 3, a third layer 50 of the display unit 16 may be disposed proximate to the first side 44 of the second layer 40 and at least partially cover the second layer 40. In one non-limiting example, the third layer 50 may extend beyond the periphery defining the second layer 40. This may be due to an offset configuration. In the offset configuration, part of the third layer 50 may overlap with at least part of the second layer 40 and another part of the third layer 50 may extend beyond the periphery of the second layer 40. As an alternative, the perimeter of the third layer 50 may be greater than the perimeter of the second layer 40. As another example, the third 50 layer may be sized to the second layer 40.

In one example, due to the positioning of the third layer 50 relative to the second layer 40, the opacity, translucence or transparency of the second layer 40 may have no impact on content rendered on the third layer 50. The third layer 50 is effectively displayed above or positioned on top of the second layer 40 relative to the passenger compartment of the vehicle, while the second layer 40 is positioned beneath the third layer 50 and positioned above the first layer 30 relative to the passenger compartment of the vehicle.

The third layer 50 includes a body 52 defining a first side 54 and an opposing second side 56 that may be disposed proximate to the first side 44 of the second layer 40. The first side 54 of the third layer 50 may be configured to generate one or more primary indicators 60 that may be rendered or digital representations of content displayed on the third layer 50 based upon one or more control signals 29 received from the first processing unit 24 in response to one or more input signals 25 detected by the second processing unit 28.

The one or more primary indicators 60 are also referred to as tell-tales. Attributes of the tell-tales or indicators may be adjusted to represent the functional or operational state of the associated vehicle component or feature. Unlike traditional display systems, wherein tell-tales, indicators and warning lights were formed as a physical hardware piece, with an independent light source cooperating with an applique having an image applied thereon that is illuminated by the light source, the one or more primary indicators 60 are generated on the first side 54 of the third layer 50 as renderings or digital representations of information and content relating to operation of the vehicle.

Certain tell-tales or indicators for vehicles are required by automobile operating and safety standards. Common areas may be provided on the instrument cluster to group the required tell-tales. The tell-tales must be located and illuminated on the vehicle instrument cluster to ensure accessibility, visibility and recognition in any operation mode by a user of the vehicle in both daylight and nighttime conditions. Exemplary tell-tales and indicators required by automobile operating and safety standards include, but are not limited to, airbag function status, anti-lock braking system status, braking system status, hand brake actuation status, check engine or engine functionality status, vehicle tire low pressure status, and front seat belt status.

The one or more primary indicators 60 are displayed in response to detection of a change in the operating parameters of one or more associated vehicle components 26 shown in FIG. 2. For example, a primary indicator 60 may be actuated in response to the detection of the inactivity or inoperability of a vehicle anti-lock braking system to notify the occupant of the vehicle that the braking system requires adjustment.

An input signal 25 generated by the anti-lock braking system vehicle component 26 is received and detected by the second processing unit 28. In response, the second processing unit 28 generates and transmits an output signal 27 to the first processing unit 24. The first processing unit 24 generates and transmits one or more control signals 29 to generate the one or more primary indicators 60 on the third layer 50 of the display unit 16.

The color of the tell-tale or indicator may be associated with the status of a vehicle component, such as a red colored indicator representing an excessively hot temperature of an engine or an amber colored indicator representing an engine service notice. The lighting of the tell-tale may be modified to identify the status of the vehicle component, such as an intermittently actuated or blinking light to indicate a warning status or a fully actuated light to indicate a vehicle component fault status.

As shown in the FIGS. 3 and 4, the one or more primary indicators 60 provided on the third layer 50 of the display unit 16 are positioned in a central region 62 of the display surface 18 of the instrument cluster 12 adjacent a lower edge 64 of the instrument cluster 12, though it is understood that the location and grouping of the one or more indicators may be adjusted to accomplish the purposes of the display system 10. In one or more aspects shown in FIG. 3, the backlight 38 cooperates with the third layer 50 to illuminate the one or more primary indicators 60 when the one or more primary indicators 60 are rendered on the third layer 50 in response to control signals 29 transmitted by the first processing unit 24 shown in FIG. 2. The one or more primary indicators 60 rendered or displayed on the third layer 50 are representative of at least one operating state of the one or more vehicle components 26.

One or more secondary indicators 66 or tell-tale content may also be displayed on the display unit 16. The one or more secondary indicators 66 display notifications about the operating status of the vehicle or of secondary vehicle components. The one or more secondary indicators 66 may display a rendering or digital representation of the activation or deactivation of one or more components 26 of a vehicle, including, but not limited to, activation of a cruise control feature, rear seat belt status, lane departure system status and notices, pedestrian detection system status, speed limiting system status and the like.

For example, a secondary indicator 66 may be actuated in response to the detection of the activation or deactivation of a vehicle cruise control system to notify the occupant of the vehicle that the vehicle cruise control system is in use or not in use. An input signal 25 generated by the vehicle cruise control system component 26 is received and detected by the second processing unit 28. In response, the second processing unit 28 generates and transmits an output signal 27 to the first processing unit 24. The first processing unit 24 generates and transmits one or more control signals 29 to generate the secondary indicator 66 on the first layer 30 of the display unit 16 indicative of the vehicle component operating status.

Unlike the one or more primary indicators 60 described above, the one or more secondary indicators 66 do not display vehicle functions or features that are regulated by automobile standards and thus do not require illumination and presentation in any vehicle operating condition. As illustrated in FIG. 3, the one or more secondary indicators 66 may be content rendered or digitally displayed on a portion 68 of the first side 34 of the first layer 30 in response to one or more control signals 29 from the first processing unit 24.

Referring now to FIGS. 1, 3, 5A, 5B, and 5C, the system and method for adjusting the display of light-based content on the instrument cluster 12 of the display system 10 is described in greater detail. The relative transparency or opacity of the second layer 40 may be adjustable between at least a light permeable state, such as a transparent state or a translucent state, and a light impermeable state, such as an opaque state.

Figure 5A:
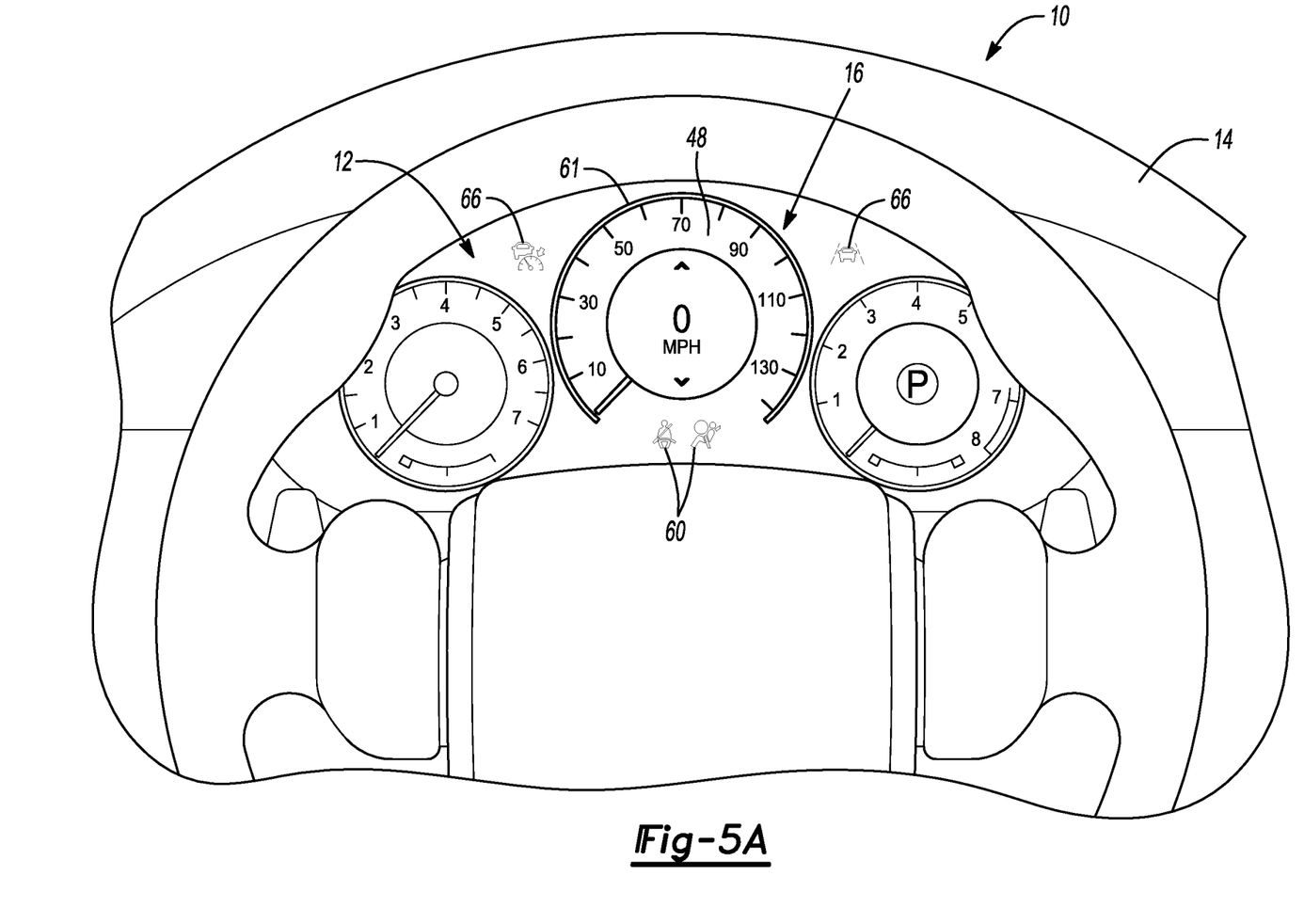
FIGS. 5A, 5B and 5C are perspective views of the display unit of the display system illustrating varying levels of the display of light-based content on the vehicle electronic instrument cluster.

As one non-limiting representation, FIGS. 3 and 5A illustrates the second layer 40, of the display unit 16, in a light permeable transparent state. In the transparent state, the second layer 40 permits one hundred percent (100%) light transmittance or light intensity of the backlight 38 through the second layer 40.

The second layer 40, in the light permeable transparent state, allows content 48 rendered on the first side 34 of the first layer 30 in response to one or more control signals 29 from the first processing unit 24 that is illuminated by backlight 38 and projected from the first layer 30 to pass through the adjacent second layer 40 without restriction. The light permeable transparent state of the second layer 40 allows display of content 48 rendered on the first layer 30, such as a virtual speedometer 61 and one or more secondary indicators 66 shown in FIG. 5A, to be readily viewed by an occupant of the passenger compartment of the vehicle.

The one or more primary indicators 60 are rendered or digitally displayed on the third layer 50 of the display unit 16 by the first processing unit 24 in response to one or more control signals 29 from the first processing unit 24 based upon one or more output signals 27 from the second processing unit 28. The one or more primary indicators 60 are illuminated by the backlight 38. As will be discussed in greater detail below, regardless of the light permeability state of the second layer 40, the primary indicators 60 rendered on the third layer 50 by the first processing unit 24 are viewable to the occupant of the passenger compartment of the vehicle in each of FIGS. 5A, 5B and 5C.

Figure 5B:
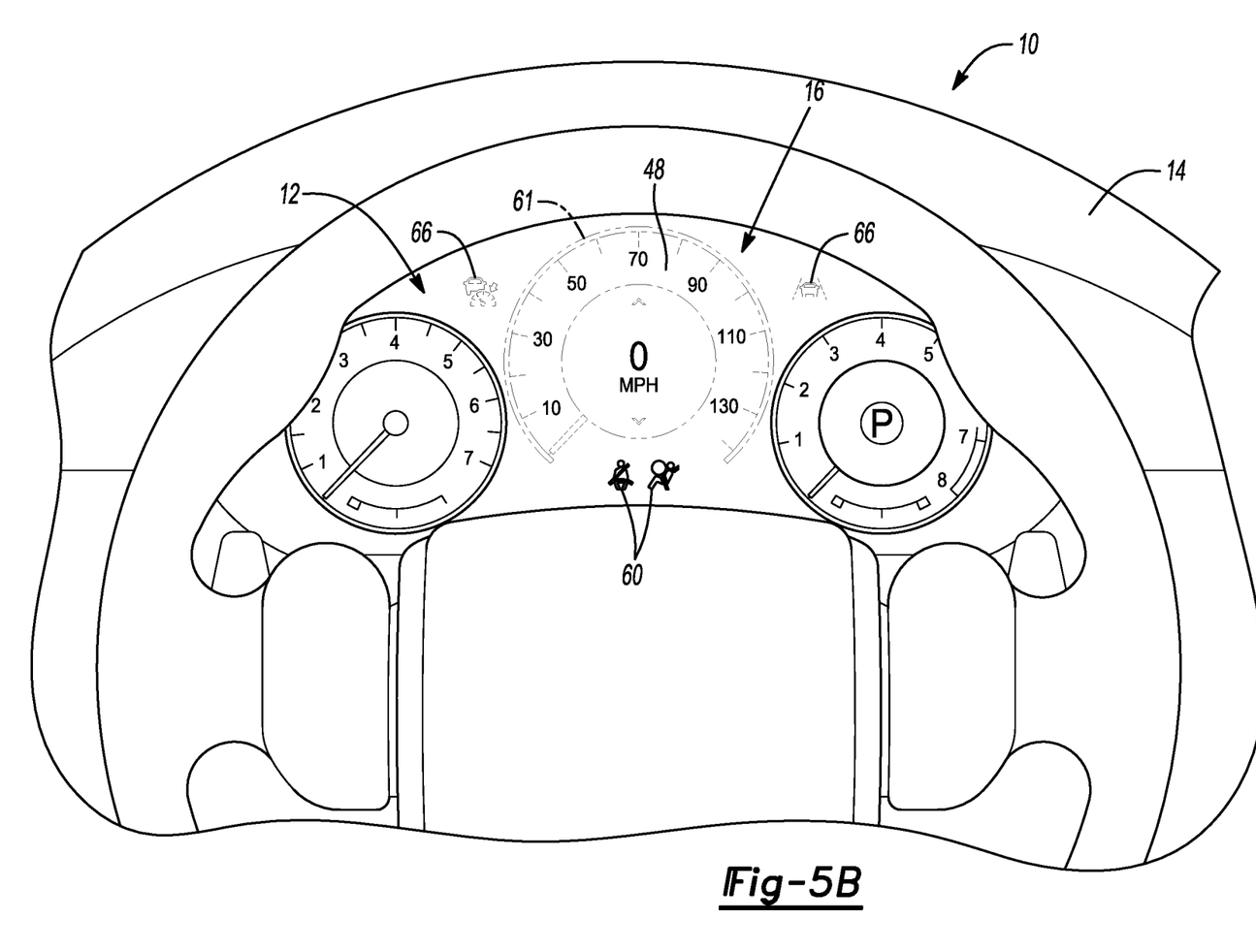

Referring to FIGS. 3 and 5B, the instrument cluster 12 of the display system 10 is shown with the second layer 40 of the display unit 16 in a light permeable translucent state. In the translucent state, the light permeability of the second layer 40 may be adjusted in response to one or more control signals 29 from the first processing unit 24 such that the second layer 40 allows between greater than zero percent (0%) light transmittance or light intensity and less than one hundred percent (100%) light transmittance or light intensity through the second layer 40. Compared to the light permeable transparent state, the light permeable translucent state allows less light permeability or reduces the light intensity displayed or projected from the first layer 30 through the second layer 40.

The second layer 40, in the light permeable translucent state, allows content 48 rendered or digitally displayed on the first side 34 of the first layer 30 in response to one or more control signals 29 from the first processing unit 24 to be illuminated by backlight 38 and projected from the first layer 30 through the adjacent second layer 40, at least in part. The light permeable translucent state of the second layer 40 effects the contrast or light transmissive properties of the content 48, such as the virtual speedometer 61 and one or more secondary indicators 66 shown in Figure B, displayed on the first side 34 of the first layer 30 of the display unit 16.

From a viewer's perspective in FIG. 5B, the content 48 displayed on the instrument cluster 12 that is generated on the first layer 30 and illuminated by backlight 38, due to the light permeable translucent state of the second layer 40, appears dim relative to the content 48 displayed on the instrument cluster 12 shown in the light permeable transparent state of FIG. 5A. The light transmittivity of the one or more primary indicators 60 rendered on the third layer 50 and illuminated by the backlight 38 is not affected by the change from the light permeable transparent state to the light permeable translucent state of the second layer 40.

Figure 5C:
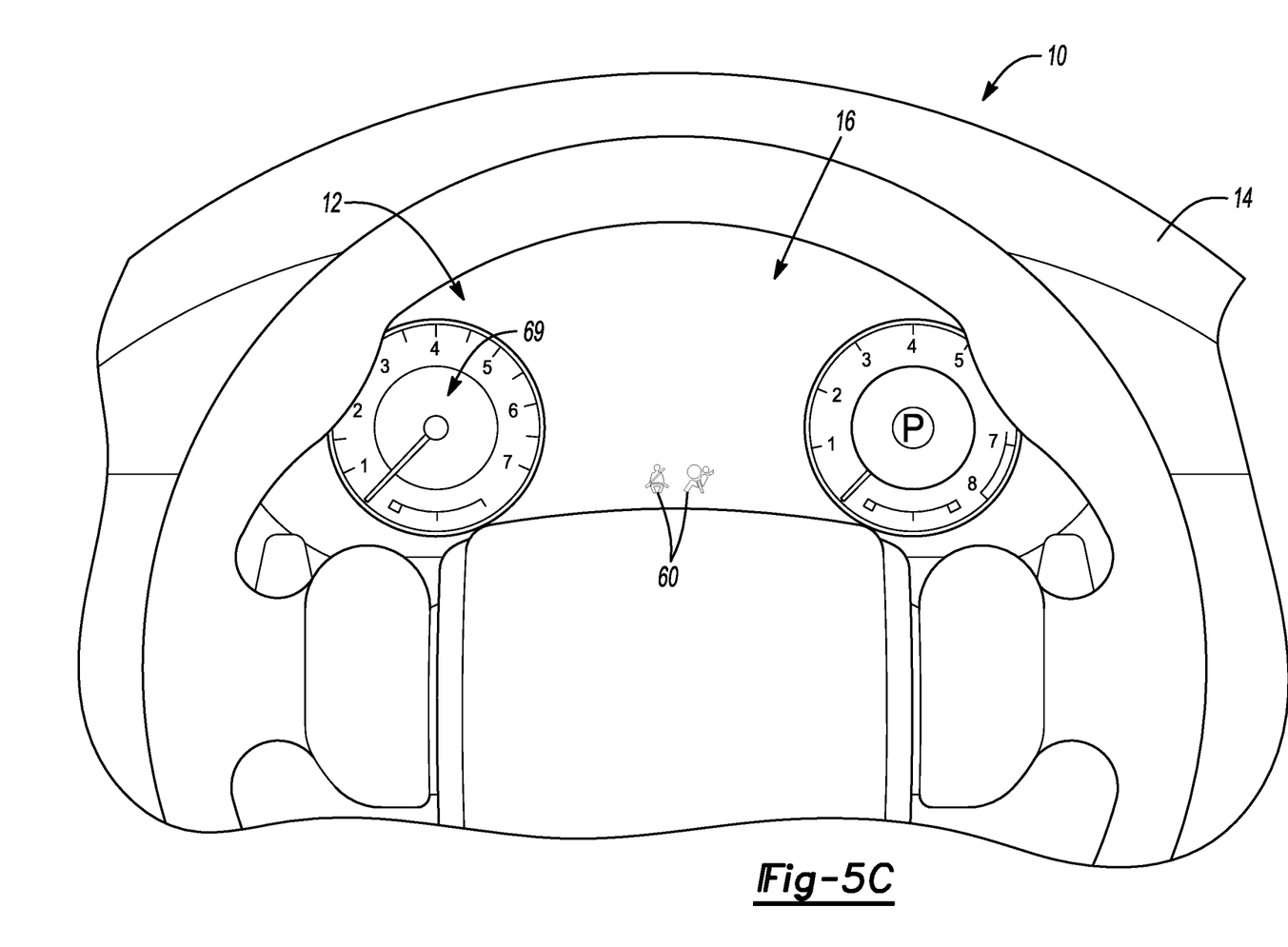

Referring to FIGS. 3 and 5C, the instrument cluster 12 is illustrated with a second layer 40 of the display unit 16 in the light impermeable opaque state. In the light impermeable opaque state, the impermeability of the second layer 40 to light may be adjusted from a light permeable state to an light impermeable state in response to one or more control signals 29 from the first processing unit 24 such that the second layer 40 allows zero percent (0%) light transmittance or light intensity from the backlight 38 and first layer 30 through the second layer 40. Compared to the light permeable translucent state, the light impermeable opaque state allows less light permeability or reduces the light intensity displayed or projected from the first layer 30 through the second layer 40.

The second layer 40, in the light impermeable opaque state, blocks content 48 rendered or digitally displayed on the first side 34 of the first layer 30. In the light impermeable opaque state, content rendered on the first layer 30 and illuminated by backlight 38 is unable to project from the first layer 30 through the second layer 40. From a viewer's perspective, the rendered content 48 of the first layer 30 that is illuminated by the backlight 38 is not viewable.

Instead, an occupant of the passenger compartment of the vehicle may simply see a solid color, such as black, due to the light impermeable opaque state of the second layer 40, as opposed to the rendered or digitally displayed content 48 on the first layer 30. The one or more primary indicators 60 rendered on the third layer 50 and any related analog dials 69 disposed above the third layer 50 are not affected by the change of the second layer 40 from the light permeable transparent or translucent state to the light impermeable opaque state.

In one non-limiting example, the display unit 16 of the display system 10 may incorporate a brightness control system. The brightness control system uses the efficiency of the backlight 38 to calculate and control the backlight 38 to a desired brightness or luminance for the display unit 16. The efficiency of the backlight 38 may be a function of the operating temperature of the backlight 38. An exemplary system is disclosed in U.S. Pat. No. 6,388,388 issued to Weindorf et al. and assigned to Visteon Global Technologies, which is hereby incorporated by reference in its entirety.

The display unit 16 may include a temperature sensor (not shown) configured to monitor the temperature of one or more components of the display unit 16. The temperature sensor may be in electrical communication with the at least one microcontroller to provide measurements indicative of the operating temperature of the display unit 16.

In one or more aspects, the first processing unit 24 may receive one or more signals indicative of a dimming level value and a temperature reading from the display unit 16. The first processing unit 24 may execute logic to evaluate the temperature reading against a threshold value of light intensity of the backlight 38 or a stored look-up table of temperature readings. The look-up table may be populated with voltage/backlight intensity levels to apply to the backlight 38, corresponding to temperature readings from the temperature sensor.

The first processing unit 24 may transmit one or more control signals 29 to the backlight 38 based upon an evaluation of the dimming level value and the threshold value based upon the look-up table of temperature readings. The first processing unit 24 may transmit one or more control signals 29 representing a light transmittance or light intensity percentage value to the backlight 38 to set the dimming level value for the display unit 16.

Figure 6:
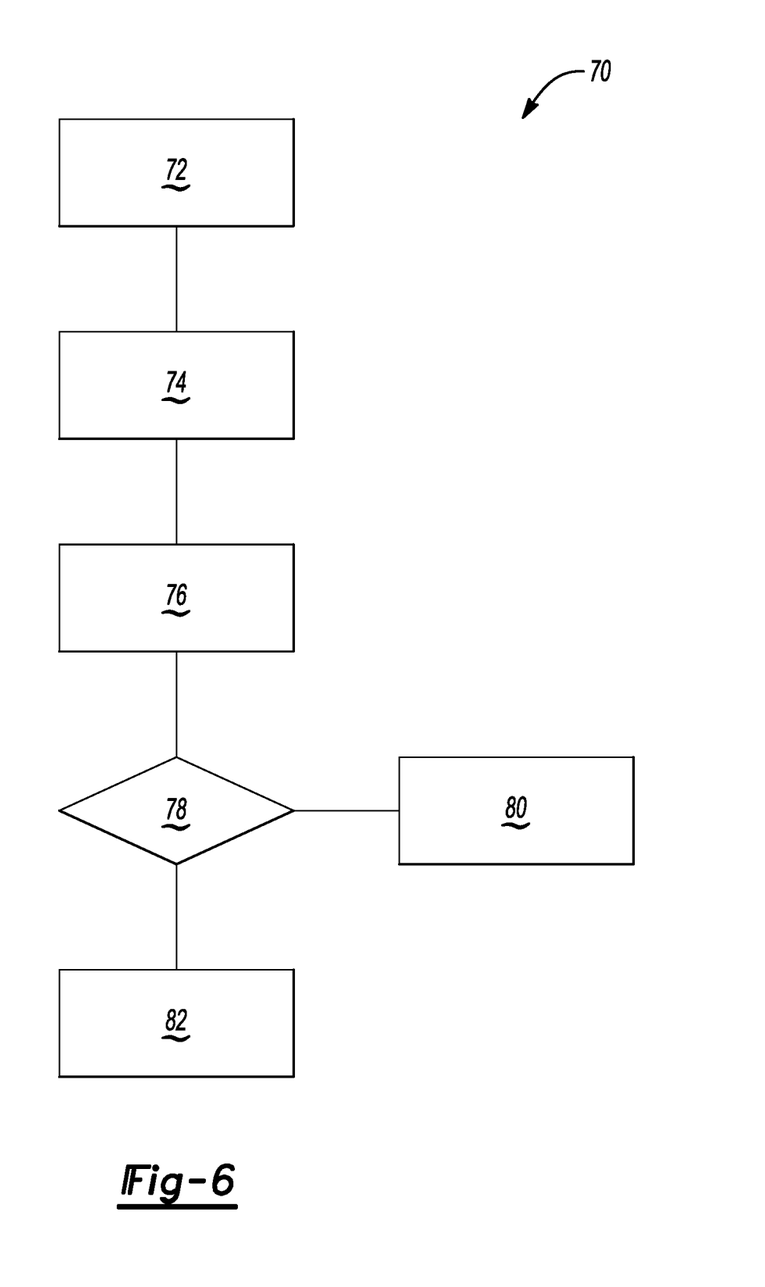
FIG. 6 is a flow chart showing an aspect of a method for adjusting the display of light-based content on a vehicle electronic instrument cluster described herein.

Referring now to FIG. 6, methods and logic for executing the system for adjusting the display of light-based content on an instrument cluster 12 are described in greater detail and referenced generally by numeral 70. Components of the display system 10 may be referred to or described herein by the respective reference numbers used in FIGS. 1-5C without being shown in FIG. 6. One or more input signals 25, generally represented by block 72, are received, detected and evaluated by the second processing unit 28. The one or more input signals 25 from one or more vehicle components 26 received and detected by the second processing unit 28 may represent the detection or measurement of a change in value or operating status of a primary or secondary vehicle system or component 26.

Further, the one or more input signals 25 received and detected by the second processing unit 28 may represent measurement of a dimming level value request for the backlight 38 of the instrument cluster 12. For example, the input signal 25 received by the second processing unit 28 may be based upon output from a sensor, such as a photocell employing a photodiode or photoresistor. The sensor may measure the ambient light level in the vehicle, based upon brightness, luminescence or the like. Alternatively, the input signal 25 may be based upon input received from the actuating device 15 or GUI interface shown in FIG. 1 correlating to a user requesting a light permeability or dimming level for the display unit 16.

In response to the one or more input signals 25, at block 74, the second processing unit 28 generates and transmits one or more output signals 27 received by the first processing unit 24 representative of the requested light intensity of the backlight 38 as a dimming value. The one or more output signals 27 may be representative of a dimming value of light intensity of the backlight 38 based on the one or more input signals from the one or more vehicle components 26. In one or more aspects, the dimming level value transmitted from the first processing unit 24 to the backlight 38 may be in a range with a lower level about forty percent (40%) light transmittance or light intensity of the backlight 38 and an upper level of one hundred percent (100%) light transmittance or light intensity of the backlight 38.

It is understood that the lower level and upper level of the range of light intensity of the backlight 38 may be adjusted to accommodate various vehicle, system, method or user settings or configurations. As a result, the light transmittance or light intensity of the rendered or digitally displayed content 48, such as the virtual instruments and one or more secondary indicators 66 generated and displayed on the first layer 30, and the one or more primary indicators 60 displayed on the third layer 50, may be projected at no less than about forty percent (40%) light transmittance or light intensity.

For example, in one non-limiting aspect, if the dimming level value determined by the second processing unit 28 is about sixty percent (60%) light transmittance or light intensity of the backlight 38 and the backlight dimming value lower range limit is about forty percent (40%) light transmittance or light intensity of the backlight 38, the first processing unit 24 transmits one or more control signals to the backlight 38 to set the backlight light intensity to the dimming level value, i.e., a value of sixty percent (60%) light transmittance or light intensity of the backlight 38.

The backlight 38 will project light through the first layer 30 to illuminate content 48, such as virtual instruments and one or more secondary indicators 66, rendered or digitally displayed on the first surface of the first layer 30 by the first processing unit 24, at the dimming level value of sixty percent (60%) light transmittance or light intensity. Additionally, the backlight 38 will illuminate one or more primary indicators 60 rendered or digitally displayed on the third layer 50 at the dimming level value of sixty percent (60%) light transmittance or light intensity of the backlight 38.

In another example, if the dimming level value determined by the second processing unit 28 is about twenty percent (20%) light transmittance or light intensity of the backlight 38 and the backlight dimming value lower range limit is about forty percent (40%) light transmittance or light intensity of the backlight 38, the first processing unit 24 generates and transmits one or more control signals 29 to set the backlight light intensity to the threshold value, i.e., a value of about forty percent (40%) light transmittance or light intensity of the backlight 38. The backlight 38 will illuminate the first set of indicators 60 on the third layer 50 and virtual instruments and one or more secondary indicators 66 on the first layer 30 of the display unit 16 at the threshold value of about forty percent (40%) light transmittance or light intensity of the backlight 38.

In response to the one or more input signals 25, the second processing unit 28, at block 76, generates and transmits one or more output signals 27 to the first processing unit 24 with values representative of the requested display functions for the instrument cluster 12. The second processing unit 28 may transmit one or more output signals 27 to the first processing unit 24 indicative of the change in status of a primary or secondary vehicle system or component 26 in response to an input signal 25 received from one or more vehicle components 26. The first processing unit 24, in response to the output signal 27, may generate one or more control signals 29 to render or digitally display one or more display features or indicators on one or more of the first layer 30 and third layer 50 of the display unit 16.

In one or more aspects, the second processing unit 28 may transmit one or more output signals 27 to the first processing unit 24 with a value representative of a dimming level for content displayed on the instrument cluster 12. The dimming level value of the display unit 16 may range between zero percent (0%) light transmittance or light intensity, wherein content is not viewable on the first layer 30 of the display unit 16, and one hundred percent (100%) light transmittance or light intensity.

The first processing unit 24 executes logic, at block 78, to evaluate the dimming level value received from the second processing unit 28 against a system threshold value. The system threshold value may be a stored value representing a desired level of light transmittance or light intensity of the backlight 38. As one example, this may be a percentage of a maximum illumination value of the backlight 38. In one or more aspects, the stored system threshold value for dimming of the backlight and the display unit may be about forty percent (40%) light transmittance or light intensity of the backlight 38. Alternatively, the system threshold value may be obtained from a stored look-up table of backlight light transmittance values. The look-up table may be populated with voltage levels to apply to the backlight 38, corresponding to light intensity ranges.

If the dimming level value received by the first processing unit 24, at block 78, is greater than or equal to the system threshold value, the first processing unit 24, at block 80, transmits one or more control signals 29 to adjust the second layer 40 to a light permeable transparent state. In the prior example where the dimming level value received by the second processing unit 28 is about sixty percent (60%) light transmittance or light intensity of the backlight 38 and the backlight dimming value lower range limit is about forty percent (40%) light transmittance or light intensity of the backlight 38, the second layer 40, in response to receiving the control signal, allows one hundred percent (100%) light transmittance or light intensity through the second layer, thereby allowing content displayed on the first side of the first layer 30 to be projected through the adjacent second layer 40 without restriction, as illustrated in FIG. 5A.

If the dimming level value received by the first processing unit 24, at block 78, is less than the system threshold value, the first processing unit 24 may transmit one or more control signals 29, at block 82, to adjust the light permeability or light impermeability of the second layer 40 to a value between zero percent (0%) light transmittance and less than one hundred percent (100%) light transmittance through the second layer 40. In the prior example where the dimming level value transmitted by the second processing unit 28 is about twenty percent (20%) light transmittance or light intensity of the backlight 38 and the backlight dimming value lower range limit is about forty percent (40%) light transmittance or light intensity of the backlight 38, the first processing unit 24 may transmit one or more control signals 29 to place the second layer 40 to a light permeable translucent state. The second layer 40, in response to receiving a control signal 29 from the first processing unit 24, adjusts the translucence of the second layer to about fifty percent (50%) light transmittance.

From the viewer's or occupant of the vehicle's perspective, the rendered or digitally displayed content 48 displayed on the first side 34 of the first layer 30, such as the virtual instruments and one or more secondary indicators 66 in FIG. 5B, and illuminated by the backlight 38 at about forty percent (40%) light transmittance or light intensity, to appear dimmed to the desired dimming level value of twenty percent (20%) light transmittance or light intensity. As such, from the viewer's perspective, setting the second layer 40 to about fifty percent (50%) light transmittance or light intensity will result in halving the light intensity associated with the backlight 38, for the content 48 rendered or displayed on the first layer 30.

In this example, the virtual instruments and one or more secondary indicators 66 on the first layer 30 will appear to be dimmed to the desired dimming level value of twenty percent (20%) light transmittance or light intensity, even though the backlight 38 may be emitting light at a higher value, such as the threshold value of about forty percent (40%) light transmittance or light intensity. While the content 48 may be dimmed down to the desired dimmed level value of twenty percent (20%) light transmittance or light intensity, the content of the third layer 50 may still appear, from the viewer's perspective, to be displayed with a light intensity at the threshold value, i.e., about forty percent (40%) light transmittance or light intensity. As such, the one or more primary indicators 60 on the third layer 50 may be rendered or displayed on the instrument cluster 12 at a different illumination level than the content 48 rendered or displayed on the first layer 30.

In an alternative aspect, if the dimming level value transmitted by the second processing unit 28 is zero percent (0%) light transmittance or light intensity, the first processing unit 24, at block 82, may transmit one or more control signals 29 to adjust the opacity of the second layer 40 to a light impermeable opaque state such that the second layer 40 is impermeable to light. This results in the second layer 40 being zero percent (0%) light transmittance or light intensity. If the second layer 40 is in a light impermeable opaque state, content 48 displayed on the first side 34 of the first layer 30, such as the virtual instruments and one or more secondary indicators 66, is not viewable through the second layer 40, from the viewer's perspective, as is shown in FIG. 5C.

In another alternative aspect, if the second processing unit 28 receives one or more input signals 25 indicative of a dimming level value and a temperature reading and the dimming level value is greater than or equal to the system threshold value based upon a temperature sensor reading, the first processing unit 24 may transmit one or more control signals 29 to the backlight 38 to adjust the light transmittance or light intensity of the backlight 38 to a threshold value from the look-up table. This may result in content 48 on the first layer 30 to appear dim relative to the light permeable transparent state, from the viewer's perspective. The resulting dimming level value will assist in cooling the operating temperature of the display unit 16 of the display system 10.

Through differential dimming, from the viewer's perspective, content such as the one or more primary indicators 60 on the third layer 50 may be at most dimmed down to a threshold value. Content 48 on the first layer 30, such as the virtual instruments and the one or more secondary indicators 66, may be dimmed below the threshold value, such that the content of the first layer 30 is not viewable by the viewer. Differential dimming may be useful when dealing with hierarchical content.

For example, regulations may dictate that certain content needs to be visible to a viewer or occupant of a vehicle, such as a driver. Additionally, or alternatively, certain mission critical content may have a higher priority than other content. Moreover, other content may be up to the viewer or occupant's discretion regarding visibility. Through differential dimming, the viewer or occupant could dim completely down discretionary content, while still being able to see regulated content and/or mission critical content.

The detailed description and the drawings or figures are supportive and descriptive of the disclosure, but the scope of the disclosure is defined solely by the claims. While some of the aspects for carrying out the claimed teachings have been described in detail, various alternative designs and aspects exist for practicing the disclosure defined in the appended claims.

The invention claimed is:

1. A display system for a vehicle comprising:
a display unit including a backlight and one or more layers cooperating with the backlight, wherein the one or more layers include:
  a first layer, the first layer including a first side for displaying content and an opposing second side cooperating with the backlight,
  a second layer adjustable between at least a light permeable state and a light impermeable state, the second layer including a first side and an opposing side disposed proximate the first side of the first layer, and
  a third layer, the third layer including a first side for displaying one or more primary indicators and an opposing second side disposed proximate the first side of the second layer;
a first processing unit coupled to the one or more layers and the backlight of the display unit; and
a second processing unit in coupled to the first processing unit, wherein the first processing unit is configured to render the content displayed on the first layer and the one or more primary indicators displayed on the third layer in response to one or more output signals from the second processing unit,
wherein the first processing unit is configured to:
  detect the one or more output signals from the second processing unit representative of a dimming level value of light intensity of the backlight,
  evaluate the dimming level value against a system threshold value of light intensity of the backlight, and
  generate one or more control signals to adjust light intensity of the backlight in response to the evaluation of the dimming level value against the system threshold value.

2. The display system of claim 1 wherein:
the second processing unit is configured to detect the one or more input signals from one or more vehicle components that represent measurements of at least one operating state of the one or more vehicle components;
the second processing unit is configured to transmit the one or more output signals to the first processing unit representative of the at least one operating state of the one or more vehicle components; and
the first processing unit is configured to render the content displayed on the first side of the first layer and render the one or more primary indicators on the first side of the third layer representative of the at least one operating state of the one or more vehicle components.

3. The display system of claim 2 wherein the one or more vehicle components further comprises a sensor for measuring an ambient light level of the vehicle, wherein the sensor is configured to transmit an input signal to the second processing unit, wherein the input signal is representative of the dimming level value of light intensity of the backlight.

4. The display system of claim 2 wherein the one or more vehicle components further comprises an actuating device implementable to transmit an input signal to the second processing unit, wherein the input signal is representative of the dimming level value of light intensity of the backlight.

5. The display system of claim 1 wherein the first processing unit is configured to generate the one or more control signals to adjust the second layer to one of the light permeable state and the light impermeable state to adjust light intensity of the content on the first layer projected through the second layer of the display unit in response to the evaluation of the dimming level value of light intensity of the backlight against the system threshold value of light intensity of the backlight.

6. The display system of claim 5 wherein, in response to the first processing unit determining that the dimming level value of light intensity of the backlight is greater than or equal to the system threshold value of light intensity of the backlight, the first processing unit is configured to:
transmit one or more control signals to the backlight to adjust light intensity of the backlight to the dimming level value; and
transmit one or more control signals to adjust the second layer to a light permeable transparent state.

7. The display system of claim 5 wherein, in response to the first processing unit determining that the dimming level value of light intensity of the backlight is less than the system threshold value of light intensity of the backlight, the first processing unit is configured to:
- transmit one or more control signals to the backlight to adjust light intensity of the backlight to the threshold value; and
- transmit one or more control signals to adjust the second layer to a light permeable translucent state.

8. The display system of claim 5 wherein, in response to the first processing unit determining that the dimming level value of light intensity of the backlight is zero, the first processing unit is configured to:
- transmit one or more control signals to the backlight to adjust light intensity of the backlight to the threshold value; and
- transmit one or more control signals to adjust the second layer to the light impermeable opaque state.

9. A non-transitory computer-readable medium with computer-readable instructions stored therein for adjusting light intensity of a display system of a vehicle, the display system including a display unit having a backlight, a first layer for displaying content and cooperating with the backlight, a second layer adjustable between at least a light permeable state and a light impermeable state disposed proximate the first layer, and a third layer for displaying one or more primary indicators disposed proximate the second layer, wherein execution of the computer-readable instructions by a first processing unit and a second processing unit of a microcontroller causes the microcontroller to:
- detect one or more input signals with the second processing unit from one or more components of the vehicle;
- command the second processing unit to transmit one or more output signals to the first processing unit representative of a dimming value of light intensity of the backlight based on the one or more input signals from the one or more vehicle components;
- command the first processing unit to evaluate the one or more output signals from the second processing unit against a system threshold value of light intensity of the backlight;
- command the first processing unit to transmit one or more control signals to adjust light intensity of the backlight in response to the evaluation of the dimming level value against the system threshold value; and
- command the first processing unit to transmit one or more control signals to adjust the second layer to one of the light permeable state and the light impermeable state to adjust light intensity of the content on the first layer projected through the second layer of the display unit in response to the evaluation of the dimming level value against the system threshold value.

10. The computer-readable medium of claim 9, wherein execution of the computer-readable instructions by the first processing unit and the second processing unit of the microcontroller causes the microcontroller to:
- detect with the second processing unit the one or more input signals of the one or more vehicle components representative of measurements of at least one operating state of the one or more vehicle components;
- command the second processing unit to transmit one or more output signals to the first processing unit representative of the at least one operating state of the one or more vehicle components; and
- command the first processing unit to render content displayed on the first layer and render one or more primary indicators displayed on the third layer representative of the at least one operating state of the one or more vehicle components.

11. The computer-readable medium of claim 9, wherein execution of the computer-readable instructions by the first processing unit and the second processing unit of the microcontroller causes the microcontroller to:
- detect with the second processing unit an input signal from a sensor measuring ambient light level of the vehicle representative of a dimming level value of light intensity of the backlight.

12. The computer-readable medium of claim 9, wherein execution of the computer-readable instructions by the first processing unit and the second processing unit of the microcontroller causes the microcontroller to:
- detect with the second processing unit an input signal from an actuating device representative of a dimming level value of light intensity of the backlight.

13. The computer-readable medium of claim 9, wherein execution of the computer-readable instructions by the first processing unit determines that the dimming level value of light intensity of the backlight is greater than or equal to the system threshold value of light intensity of the backlight, the first processing unit of the microcontroller causes the microcontroller to:
- command the first processing unit to transmit one or more control signals to the backlight to adjust light intensity of the backlight to the dimming level value; and
- command the first processing unit to transmit one or more control signals to adjust the second layer to a light permeable transparent state.

14. The computer-readable medium of claim 9, wherein execution of the computer-readable instructions by the first processing unit determines that the dimming level value of light intensity of the backlight is less than the system threshold value of light intensity of the backlight, the first processing unit of the microcontroller causes the microcontroller to:
- command the first processing unit to transmit one or more control signals to the backlight to adjust light intensity of the backlight to the threshold value; and
- command the first processing unit to transmit one or more control signals to adjust the second layer to a light permeable translucent state.

15. The computer-readable medium of claim 9, wherein execution of the computer-readable instructions by the first processing unit determines that the dimming level value of light intensity of the backlight is zero, the first processing unit of the microcontroller causes the microcontroller to:
- command the first processing unit to transmit one or more control signals to the backlight to adjust light intensity of the backlight to the threshold value; and
- command the first processing unit to transmit one or more control signals to adjust the second layer to a light impermeable opaque state.

16. A display system for a vehicle comprising:
- a display unit including a backlight and one or more layers cooperating with the backlight, wherein the one or more layers include:
  - a first layer including a first side for displaying content and an opposing second side cooperating with the backlight,
  - a second layer adjustable between at least a light permeable state and a light impermeable state including a first side and an opposing side disposed proximate the first side of the first layer, and
  - a third layer including a first side for displaying one or more primary indicators and an opposing second side disposed proximate the first side of the second layer;

a first processing unit for controlling the one or more layers and the backlight of the display unit; and a second processing unit for communicating with the first processing unit, wherein the first processing unit is configured to render the content displayed on the first layer and the one or more primary indicators displayed on the third layer in response to one or more output signals from the second processing unit, wherein the first processing unit is configured to:
- detect the one or more output signals from the second processing unit representative of a dimming value of light intensity of the backlight,
- evaluate the dimming level value against a system threshold value of light intensity of the backlight,
- generate one or more control signals to adjust light intensity of the backlight in response to the evaluation of the dimming level value against the system threshold value, and
- generate one or more control signals to adjust the second layer to one of the light permeable state and the light impermeable state to adjust light intensity of the content on the first layer projected through the second layer of the display unit in response to the evaluation of the dimming level value against the system threshold value.

17. The display system of claim 16 wherein:
the second processing unit is configured to detect one or more input signals from one or more components of the vehicle representative of measurements of at least one operating state of the one or more vehicle components;
the second processing unit is configured to transmit the one or more output signals to the first processing unit representative of the at least one operating state of the one or more vehicle components; and
the first processing unit is configured to render the content displayed on the first side of the first layer and render the one or more primary indicators on the first side of the third layer representative of the at least one operating state of the one or more vehicle components.

18. The display system of claim 16 wherein, in response to the first processing unit determining that the dimming level value of light intensity of the backlight is greater than or equal to the system threshold value of light intensity of the backlight, the first processing unit is configured to:
transmit one or more control signals to the backlight to adjust light intensity of the backlight to the dimming level value; and
transmit one or more control signals to adjust the second layer to a light permeable transparent state.

19. The display system of claim 16 wherein, in response to the first processing unit determining that the dimming level value of light intensity of the backlight is less than the system threshold value of light intensity of the backlight, the first processing unit is configured to:
transmit one or more control signals to the backlight to adjust light intensity of the backlight to the threshold value; and
transmit one or more control signals to adjust the second layer to a light permeable translucent state.

20. The display system of claim 16 wherein, in response to the first processing unit determining that the dimming level value of light intensity of the backlight is zero, the first processing unit is configured to:
transmit one or more control signals to the backlight to adjust light intensity of the backlight to the threshold value; and
transmit one or more control signals to adjust the second layer to a light impermeable opaque state.

* * * * *